(12) United States Patent
Waybright (10) Patent No.: US 8,720,378 B2
(45) Date of Patent: May 13, 2014

(54) MANURE SCRAPER SYSTEM AND APPARATUS

(75) Inventor: Bert J. Waybright, Gettysburg, PA (US)

(73) Assignee: Bert J. Waybright, Gettysburg, PA (US)

( * ) Notice: Subject to any disclaimer, the term of this patent is extended or adjusted under 35 U.S.C. 154(b) by 243 days.

(21) Appl. No.: 13/037,605

(22) Filed: Mar. 1, 2011

(65) Prior Publication Data

US 2012/0222225 A1  Sep. 6, 2012

(51) Int. Cl.
*A01K 1/01*   (2006.01)
(52) U.S. Cl.
USPC .................................................. 119/451
(58) Field of Classification Search
USPC ............. 119/442, 443, 450, 451, 479, 527
IPC ............................................. A01K 31/04,01/01
See application file for complete search history.

(56) References Cited

U.S. PATENT DOCUMENTS

| | | |
|---|---|---|
| 1,426,653 A | 8/1922 | Kruse |
| 2,768,734 A | 10/1956 | Klinzing |
| 3,456,779 A | 7/1969 | Andreae |
| 3,799,330 A | 3/1974 | Floter |
| 3,845,517 A * | 11/1974 | Harris .......................... 15/93.3 |
| 3,848,568 A * | 11/1974 | Hazen et al. ................... 119/527 |
| 3,985,103 A | 10/1976 | Gallei |
| 4,123,992 A | 11/1978 | Laurenz |
| 4,208,279 A | 6/1980 | Varani |
| 4,243,137 A | 1/1981 | Laurenz |
| 4,280,447 A | 7/1981 | Laurenz |
| 4,319,678 A | 3/1982 | Hesler |
| 4,320,008 A | 3/1982 | Kokubo |
| 4,354,593 A | 10/1982 | Diedrich |
| 4,489,675 A | 12/1984 | Siciliano |
| 4,708,294 A | 11/1987 | Endom |
| 4,787,338 A | 11/1988 | Stanley, Sr. et al. |
| 4,887,550 A | 12/1989 | Pirovano |
| 4,913,095 A | 4/1990 | Morrow et al. |
| 5,076,212 A | 12/1991 | Thompson et al. |
| 5,289,912 A | 3/1994 | Faulstich |
| 5,450,815 A | 9/1995 | Krehl et al. |

(Continued)

FOREIGN PATENT DOCUMENTS

| | | |
|---|---|---|
| DE | 1068179 | 10/1959 |
| DE | 4343760 | 6/1995 |

(Continued)

OTHER PUBLICATIONS

Translation of JP 2006115773, Yoshida, "Chicken manure drying apparatus", 2006.*

*Primary Examiner* — David Parsley
*Assistant Examiner* — Thien Thanh Pham
(74) *Attorney, Agent, or Firm* — Lowe Hauptman & Ham, LLP (57) ABSTRACT

Manure is scrapped from a barn floor including an elongated conduit by blades on a trolley moving in the direction of the elongated conduit. The manure passes into the conduit via a slot. The trolley has a paddle wheel and drive wheels bearing on the conduit interior lower surface. The entirety of the drive wheels and most of the paddle wheel are in the conduit. A sprocket and chain arrangement connects the wheels so that, as the drive wheels turn, the paddle wheel turns to urge manure into the conduit.

22 Claims, 5 Drawing Sheets

(56) References Cited

U.S. PATENT DOCUMENTS

| | | |
|---|---|---|
| 5,607,046 A | 3/1997 | Krehl et al. |
| 5,662,068 A | 9/1997 | Childs |
| 5,740,763 A | 4/1998 | Hollingsworth |
| 6,446,298 B1 | 9/2002 | Berg, Jr. et al. |
| 6,467,432 B1 | 10/2002 | Lewis et al. |
| 6,948,450 B2 | 9/2005 | Berg |
| 7,013,837 B2 | 3/2006 | Chun |
| 7,401,575 B2 | 7/2008 | Waybright |
| 2002/0100428 A1* | 8/2002 | Notenbomer ............... 119/447 |
| 2006/0249092 A1* | 11/2006 | Waybright ................. 119/451 |

FOREIGN PATENT DOCUMENTS

| | | | |
|---|---|---|---|
| FR | 2303468 | | 10/1976 |
| GB | 1246590 | | 9/1971 |
| JP | 02006115773 | * | 5/2006 |
| WO | 9407358 | | 4/1994 |
| WO | 9522889 | | 8/1995 |

\* cited by examiner

MANURE SCRAPER SYSTEM AND APPARATUS

FIELD OF INVENTION

The present invention relates generally to manure scrapers, and more particularly to a manure scraping system similar to that disclosed in my U.S. Pat. No. 7,401,575, incorporated herein by reference, wherein a substantial part of a trolley carrying equipment for moving the manure is located in a conduit into which the manure is scrapped. Another aspect of the invention is related to such a trolley per se. A further aspect of the invention relates to an improved conduit for a manure scraping system.

BACKGROUND

The term "manure scraper" is used in this document in the way it is ordinarily used by those who work in the field to which the invention relates, even though the term is a slight misnomer. The term "manure scraper" and related terms, such as "system for scraping manure," is used in this document to mean a device or system for scraping manure from a barn floor and moving the scrapped manure to some other location in the barn. The term "manure" as used in this document means a slurry of livestock feces and livestock urine, and possibly other liquids; typically the livestock species are domestic cattle and domestic pigs.

My U.S. Pat. No. 7,401,575 discloses a manure scraper system for a barn floor having a first elongated slot, wherein the system comprises (1) an elongated conduit having a second slot mating with the first slot so that between the slots the conduit has an upper smooth face, (2) a trolley positioned adjacent or above the conduit, and (3) a cable drive for moving the trolley in first and second opposite directions along the conduit. The trolley includes: (a) a blade arrangement extending from a body of the trolley for scraping manure from the floor into a region adjacent the slots and in front of the body in the direction of travel of the trolley as the trolley moves in the first and second directions; (b) a paddle wheel that is mounted above the floor and carries paddles that rotate about a horizontal axis for driving manure from the region into the conduit via the second slot as the trolley moves in the first and second directions; and (c) drive wheels that (i) are outside the paddle wheel and traverse a guide arrangement in the barn floor above the conduit as a result of the trolley being driven by the cable drive and (ii) are coupled with the paddle wheel to frictionally drive the paddle wheel at the same rotary speed as the wheels.

While the system specifically disclosed in my earlier patent has functioned admirably to remove manure from barns, some problems have been encountered. Because the paddle and drive wheels extend considerably above the barn floor and the drive wheels and hinges for the blades extend beyond the slot in the floor some equipment, such as tractors and skid loaders, is not able to navigate easily around the trolley and/or to clear the trolley. Also, livestock in the barn, such as cows or pigs, sometime have problems navigating around the drive and paddle wheels. In addition sometimes the slots become clogged with manure because the paddle wheel and the drive wheels rotate at the same speed that sometimes is not adequate to prevent clogging.

Another problem results from the conduit slot having strengthening members, in the form of steel plates, bearing against its side concrete walls that form the second slot. The top edges of the plates extend to the smooth face of the conduit between the mating first and second slots and on which the animals walk. Consequentially, manure covers the upper smooth face of the conduit and the top edges of the plates, causing them to become slippery. The slippery surface has caused cows to slip and some have even fallen.

It is, accordingly, an object of the present invention to provide a new and improved system and apparatus for scraping manure.

Another object is to provide a new and improved manure scraping system and apparatus including a trolley arranged for enabling equipment and livestock in a barn including the system to more easily move about in the barn.

A further object is to provide a new and improved trolley for a manure scraping system, wherein the trolley is arranged for enabling equipment and livestock in a barn including the system to more easily move about in the barn.

An added object is to provide a new and improved manure scrapping system and trolley therefor, wherein the trolley includes a paddle wheel that rotates at higher speeds than drive wheels for the paddle wheel to prevent or reduce clogging of manure in a slot of a conduit into which the manure flows.

An additional object is to provide a new and manure scrapping system including a barn with a conduit having an elongated slot with walls including wear members that has a tendency to cause livestock in the barn to slip, wherein the conduit is arranged to reduce or eliminate such slipping.

SUMMARY

According to a first aspect of the invention, a system for scraping manure from a barn floor having an elongated first slot comprises an elongated conduit in the floor. The conduit has an elongated second slot mating with the first slot. The first and second slots are arranged so manure scraped from the floor by blades on a trolley moving in the direction of the elongated conduit can pass through the second slot and move into the conduit. The trolley includes (a) a paddle rotatable about a horizontal axis that is transverse to the slots, and (b) structure carrying the paddle. The horizontal axis and the structure are located in the conduit so the paddle can extend from (a) the structure in the conduit carrying the paddle, and (b) the axis in the conduit, so that, as the paddle turns about the horizontal axis, the paddle can urge manure scraped by the blades into the conduit.

Preferably, the trolley carries wheels that are located entirely in the conduit and bear on an interior lower surface of the conduit and the wheels are drivingly connected with the structure carrying the paddles so that as the wheels turn on the lower surface of the conduit the paddle is driven about the horizontal axis. The interior lower surface of the conduit preferably has an arcuate shape that is concave with respect to the horizontal axis and the wheels bear against the arcuate shape so the arcuate shape can guide the wheels and maintain the wheels in place for substantially preventing the paddle from wobbling transversely of the slot. To reduce or eliminate clogging of manure in the second slot, the driving connection between the wheels and the structure carrying the paddle is preferably such that the paddle rotates at a higher speed than the wheels and the structure carries several paddles.

The trolley also preferably includes two sets of wheels, such that the first set of wheels is longitudinally displaced from and on a first side of the horizontal axis and the second set of wheels is longitudinally displaced from and on a second side of the horizontal axis. Each of the wheel sets includes first and second wheels on opposite sides of a center line of the second slot and on opposite sides of a point on the arcuate surface farthest from the floor in the vertical direction. The arcuate surface is preferably a segment of a circle.

The conduit preferably includes wear resisting members abutting walls of the slot and extending to a surface of the barn floor. The wear resisting members have an upper surface that tends to become slippery and tends to cause animals in a region of the barn floor where the second slot is located to slip. An upper face of the conduit between the first and second mating slots is textured to reduce and/or overcome the tendency of the animals to slip on the upper surface.

A second aspect of the invention relates to a system for scraping manure from a barn floor having an elongated first slot, wherein the system comprises an elongated conduit in the floor. The conduit has an elongated second slot mating with the first slot. The first and second slots are arranged so manure scraped from the floor by blades on a trolley moving in the direction of the elongated conduit can pass through the second slot and move into the conduit. The trolley includes (a) a paddle rotatable about a horizontal axis that is transverse to the slots, and (b) structure carrying the paddle. The trolley carries wheels that are located entirely in the conduit and bear on an interior lower surface of the conduit. The wheels are drivingly connected with the structure carrying the paddles so that as the wheels turn on the lower surface of the conduit the paddle is driven about the horizontal axis. The paddle, the slots and the structure carrying the paddle are arranged so that, as the paddle turns about the horizontal axis, the paddle can urge manure scraped by the blades into the conduit.

Preferably the wheels and conduit of the second aspect of the invention include the preferable features discussed above with the first aspect.

A third aspect of the invention relates to a conduit for use with a system for scraping manure from a barn floor having an elongated first slot, wherein the system comprises an elongated conduit in the floor and the conduit has an elongated second slot mating with the first slot. The first and second slots are arranged so manure scraped from the floor by blades on a trolley moving in the direction of the elongated conduit can pass through the second slot and move into the conduit. The trolley includes (a) a paddle rotatable about a horizontal axis that is transverse to the slots, and (b) structure carrying the paddle. The conduit includes wear resisting members abutting walls of the slot and extending to a surface of the barn floor. The wear resisting members have an upper surface that tends to become slippery and tends to cause animals in a region of the barn floor where the second slot is located to slip. An upper face of the conduit between the first and second mating slots is textured to reduce and/or overcome the tendency of the animals to slip on the upper surface.

A fourth aspect of the invention relates to a trolley for use in a system for scraping manure from a barn floor having an elongated first slot, wherein the system comprises an elongated conduit in the floor and the conduit has an elongated second slot mating with the first slot. The first and second slots are arranged so manure scraped from the floor by blades on a trolley moving in the direction of the elongated conduit can pass through the second slot and move into the conduit. The trolley comprises (a) a paddle rotatable about a horizontal axis that is arranged to be transverse to the slots, and (b) structure carrying the paddle. Parts of the trolley, including the paddle, the horizontal axis and the structure are arranged so that, when located in the conduit, the paddle can extend from (a) the axis in the conduit, and (b) the structure in the conduit carrying the paddle through the second slot so that, as the paddle turns about the horizontal axis, the paddle can urge manure scraped by the blades into the conduit.

Preferably, the wheel features discussed above in connection with the first aspect of the invention are included in the trolley of the fourth feature.

A fifth aspect of the invention relates to a trolley for use in a system for scraping manure from a barn floor having an elongated first slot, wherein the system comprises an elongated conduit in the floor and the conduit has an elongated second slot mating with the first slot. The first and second slots are arranged so manure scraped from the floor by blades on a trolley moving in the direction of the elongated conduit can pass through the second slot and move into the conduit. The trolley comprises (a) a paddle rotatable about a horizontal axis that is transverse to the slots, (b) structure carrying the paddle, and (c) wheels that are adapted to be located entirely in the conduit and adapted to bear on an interior lower surface of the conduit. The wheels are drivingly connected with the structure carrying the paddles so that as the wheels turn on the lower surface of the conduit the paddle is driven about the horizontal axis. The paddle and the structure carrying the paddle are arranged and adapted to be located in the conduit so that, as the paddle turns about the horizontal axis, the paddle can urge manure scraped by the blades into the conduit.

Preferably, the wheels of the fifth aspect are arranged in accordance with the preferable wheel features of the first aspect.

Additional aspects and advantages of the present invention are set forth in part in the description which follows, and in part are obvious from the description, or may be learned by practice of the present invention. The aspects and advantages of the present invention can also be realized and attained by the instrumentalities and combinations particularly pointed out in the appended claims. The particular embodiment of the present invention as hereinafter described in conjunction with the appended drawings, wherein like designations denote like elements, is provided to illustrate and not to limit the present invention.

DETAILED DESCRIPTION

Reference is now made to FIGS. 1-4 wherein system 10 for scraping manure from free stall barn floor 12, including elongated first slot 14 having walls 16 and 18, comprises elongated conduit 20 in the floor. Conduit 20 has an elongated second slot 22 mating with first slot 14. Slot 22 includes walls 24 and 26, respectively lined with steel wear plates 28 and 30.

Figure 1:
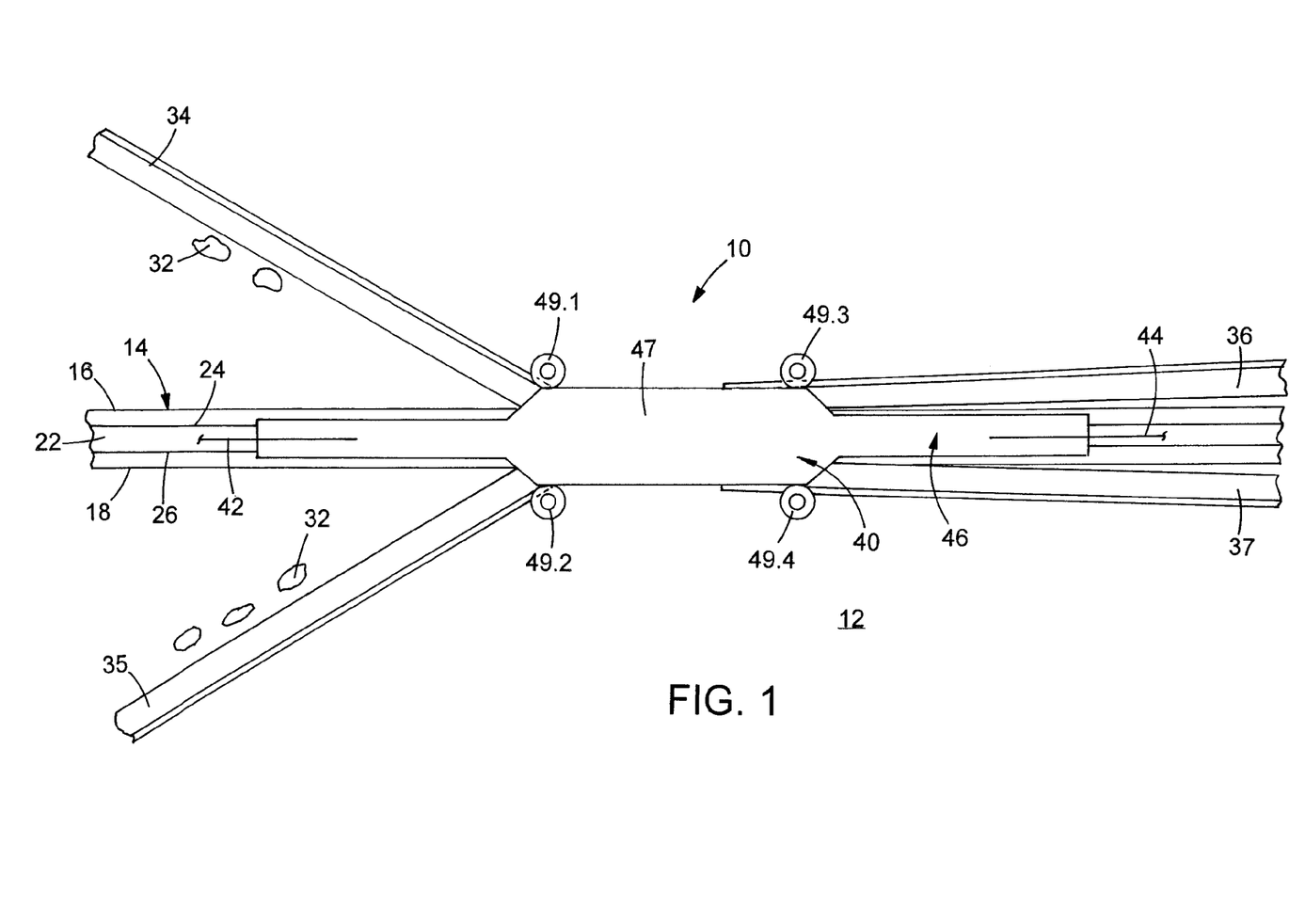
FIG. 1 is a top view of a manure scraping system including a trolley having first and second sets of arms for collecting livestock manure deposited on a barn floor.

First and second slots 14 and 22 are arranged so manure 32 scraped from floor 12 by elongated floor engaging scrapper blades 34-37 on trolley 40 can pass through slot 22 and move into conduit 20. Trolley 40 is moved back and forth in the direction of elongated conduit 20 by cables 42 and 44 and motors (not shown) which drive the cables. Cables 42 and 44 are attached to opposite ends of elongated bar 46 that includes bulging center portion 47 and forms a top frame of trolley 40. Cable 42 is fixedly attached to one end of bar 46 while cable 44 is attached to bar 46 by rotatable cable tensioner 48. Central portion 47 of bar 46 fixedly carries four hinges 49.1-49.4 to which the inner edges of blades 34-37 are respectively connected in a manner similar to that described in my earlier patent so that blades 34, 35 are open and blades 36, 37 are essentially closed when trolley 40 moves from right to left as illustrated in FIG. 1 and vice versa when trolley 40 moves from left to right. As a result blades 34-37 urge the manure on floor 12 toward slot 22 as cables 42 and 44 drive trolley 40 back and forth.

Figure 2:
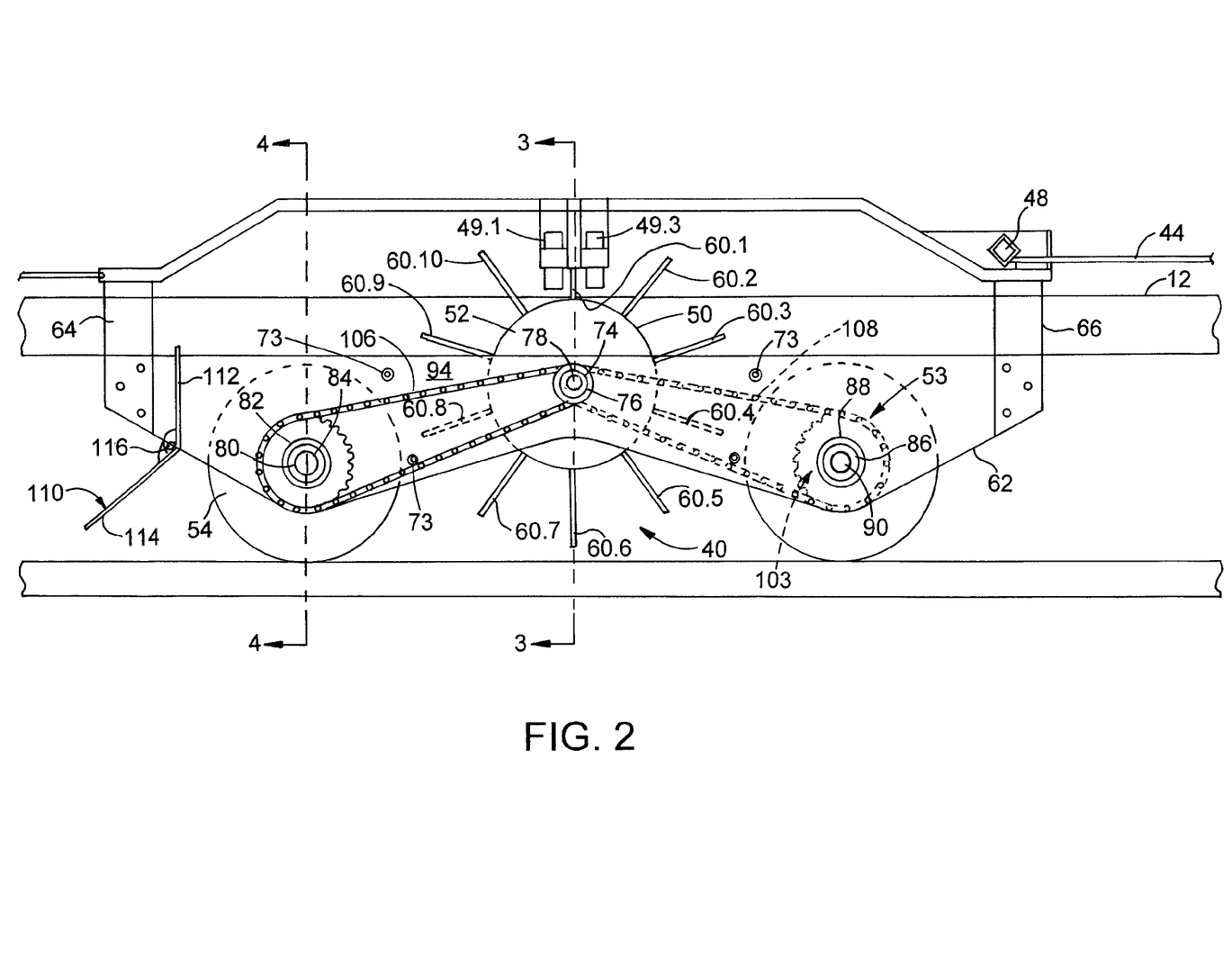
FIG. 2 is a side view of the trolley illustrated in FIG. 1, as positioned in a conduit beneath the barn floor.
Figure 3:
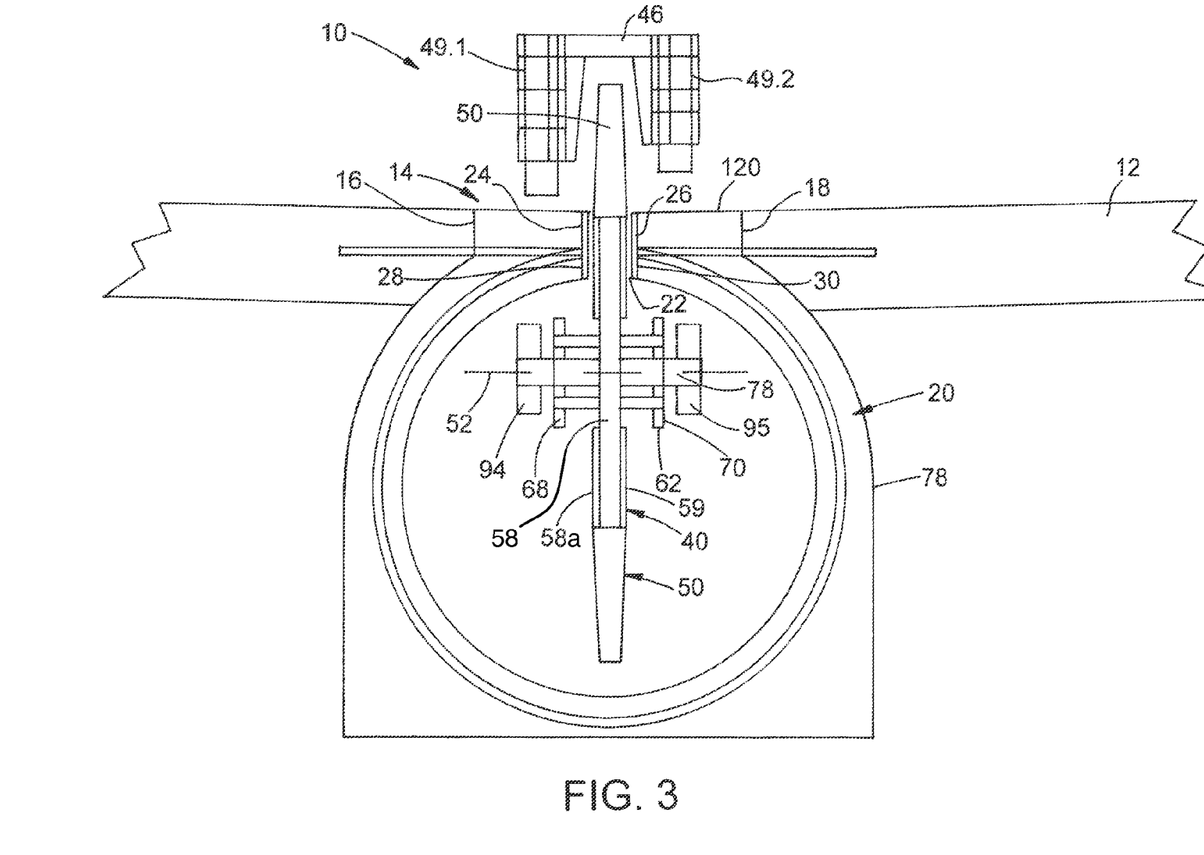
FIG. 3 is a sectional view taken through the line 3-3 of FIG. 2.
Figure 4:
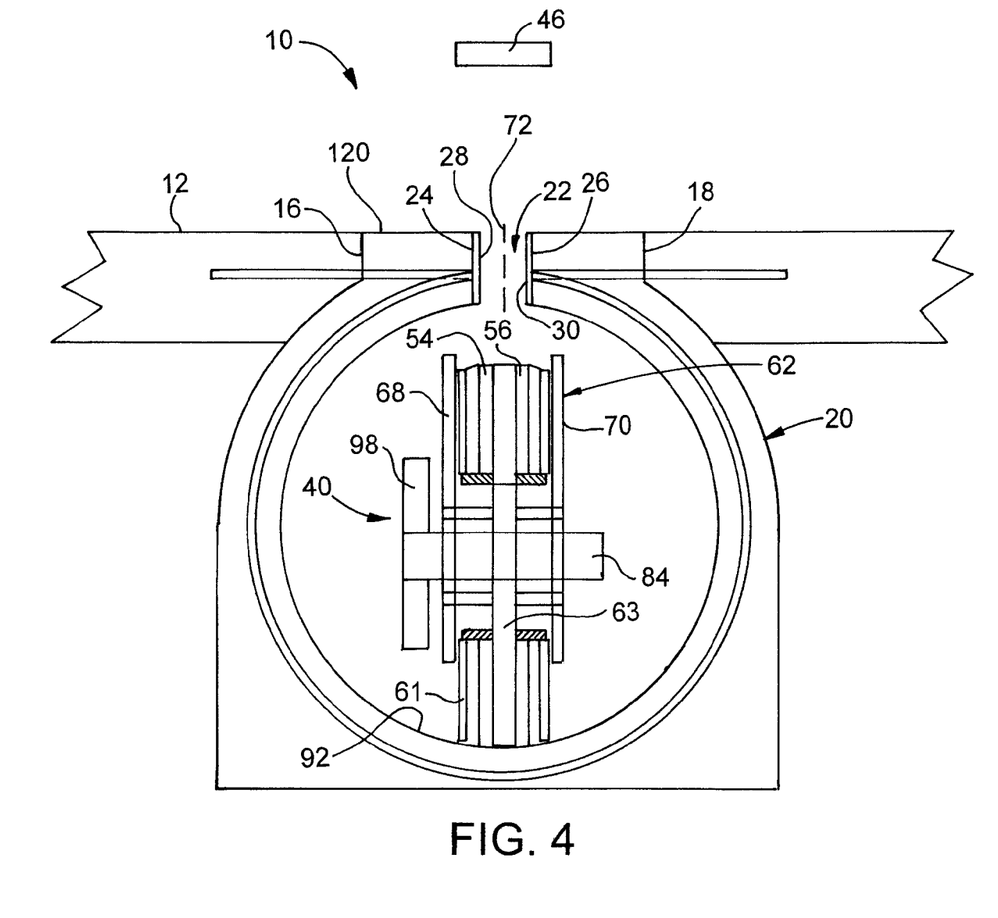
FIG. 4 is a sectional view taken through the line 4-4 of FIG. 2.

Trolley 40 includes (1) paddle wheel 50, rotatable about horizontal axis 52 that is transverse to the elongated direction of slots 14 and 22, and (2) two sets of wheels 54, 55 and 56, 57 that ride on the bottom portion of conduit 20 and are drivingly connected to paddle wheel 50 by sprocket and chain arrangement 53. (Wheel 57 is not illustrated in the drawings; however reference is made to wheel 57 for convenience, because it is the wheel that is transversely aligned with wheel 56 as illustrated in FIG. 2.) Each of wheels 54-57 is made of laminated rubber plies 61 that are bonded to the outer portions of vertically extending discs 63 which are fixedly mounted on rotating shafts of wheels 54-57. Paddle wheel 50 includes disc 58, which is vertically mounted so its vertical center line is aligned with vertical center line 72 of slot 22. The opposite faces of disc 58 are respectively protected by wear plates 58*a* and 59. Several(i. e. more than two, but not many) equally spaced paddles 60 extend radially from disc 58; in the illustrated embodiment, ten paddles 60.1-60.10 extend from disc 58.

All of wheels 54-57 are located entirely in conduit 20 and the vast majority of paddle wheel 50 is located in conduit 20 (e.g., in FIG. 2, all of disc 58, all of paddles 60.3-60.9 and some of paddles 60.1, 60.2 and 60.3 are located in conduit 20). Thus, horizontal axis 52 and the structure, in the form of disc 58, that carries paddles 60.1-60.10 are located in conduit 20, so paddle 60.1 extends from (a) axis 52 in conduit 20, and (b) disc 58 in the conduit through slot 22, so that, as one of the paddles (e.g., paddle 60.1) turns about horizontal axis 52, that paddle urges manure scraped by blades 34, 35 or 36, 37 into conduit 20 via slot 22. As a result only a small part of trolley 40 extends above the upper surface of floor 12, so livestock and equipment can easily move about the floor without substantial interference by the parts of trolley 40.

Trolley 40 includes lower frame part 62, all of which is located in conduit 20 beneath the top surface of floor 12, and carries wheels 50 and 54-57, as well as plates 64 and 66 on which opposite ends of elongated bar 46 are respectively fixedly mounted. Frame part 62 includes vertically disposed mutually parallel metal plates 68 and 70, located on opposite sides of vertical center line 72 of slot 22, and secured to each other by bolts 73. Plates 68 and 70 include a first set of aligned centrally located holes, each of which is lined by bearing and bushing assemblies 74 and 76, into which fits paddle wheel shaft 78 that extends horizontally and transversely of slots 14 and 22. Plates 68 and 70 also include second and third sets of aligned holes, such that the holes of the second and third sets are longitudinally displaced by equal distances from shaft 78 on opposite sides of shaft 78. The second set of holes on each of plates 68 and 70 is lined by bearing and bushing assemblies 80 and 82 into which fits shaft 84 on which are fixedly mounted drive wheels 54 and 55, while the third set of holes is lined by bearing and bushing assemblies 86 and 88 into which fits shaft 90 on which are fixedly mounted drive wheels 56 and 57.

Wheels 54-57 are drivingly connected by sprocket and chain arrangement 53 with paddle wheel 50 (the structure carrying paddles 60) so that, as wheels 54-57 turn on the lower interior surface 92 of conduit 20, paddle wheel 50 is driven by shaft 78 about horizontal axis 52 which is the center line of paddle wheel shaft 78. The interior lower surface 92 of conduit 20 has an arcuate shape that is concave with respect to horizontal axis 52 as a result of the interior surface of conduit 20 being essentially circular. Wheels 54 and 56 bear against a portion of a first side of surface 92 relative to slot center line 72, while wheels 55 and 57 bear against a portion of a second side of surface 92 relative to center line 72. The portions of the first and second sides are equally displaced from center line 72 that intersects the lowest point of the interior of surface of conduit 20. Hence, wheels 54-57 bear against arcuate surface 92 so the arcuate surface guides the wheels, without providing separate guide structure, and maintains the wheels in place to substantially prevent paddle wheel 50 and the paddles 60 thereof from wobbling transversely of slot 22.

To reduce or eliminate clogging of manure in slot 20, sprocket and chain arrangement 53 between drive wheels 54-57 and paddle wheel 50 are such that the paddle wheel rotates at a substantially higher speed (e.g., two times) than the drive wheels. To this end, (1) opposite ends of paddle wheel shaft 78 fixedly carry sprockets 94, 95, respectively outside of frame plates 68 and 70, (2) one end of drive wheel shaft 84 fixedly carries sprocket 98 which is outside of plate 68 and (3) one end of drive wheel shaft 90 fixedly carries sprocket 103 which is outside of plate 70. (Sprocket 103 is not illustrated in the drawings because the portion of frame plate 70 where sprocket 103 is located is not shown but it is obvious from this description where sprocket 103 is located; however reference is made to sprocket 103 for convenience.) Sprockets 98 and 103 both have the same diameter and sprockets 94 and 95 both have the same diameter, which is considerably smaller (e.g., one half) than the common diameter of sprockets 98 and 103.

Sprocket and chain arrangement 53 includes chains 106 and 108. Chain 106 is connected between sprockets 94 and 98 outside of frame plate 68, while chain 108 is connected between sprockets 95 and 103 outside of frame plate 70. Because the diameter of each of paddle sprockets 94 and 95 is much smaller (e.g., one-half) than the diameter of each of drive wheel sprockets 98 and 103, sprockets 94 and 95 turn paddle wheel 50 much faster than wheels 54-57 turn in response to trolley 40 being driven by cables 42 and 44. Because of the high rotational speed of paddle wheel 50 and the relatively large number of paddles 60 on the paddle wheel, paddles 60 always occupy slot 22 and move rapidly in the slot so clogging of manure in slot 22 rarely occurs.

Plow 110, mounted between and carried by frame plates 68, 70, includes fixed vertically extending upper plate 112 that is fixedly secured to plates 68, 70 and lower plate 114 that is pivotably connected to plate 112 by hinge 116. As described in my patent, plate 114 pushes the manure in conduit 20 while cable 42 pulls trolley 40 toward the left as illustrated in FIG. 1 and plate 114 rides over the manure in conduit 20 while cable 44 pulls trolley to the right as illustrated in FIG. 1. Alternatively or additionally to plow 110, manure in conduit 20 can be moved by a fluid injection system 62 for injecting a high pressure fluid (typically water) from a suitable source into one end of the conduit.

Figure 5:
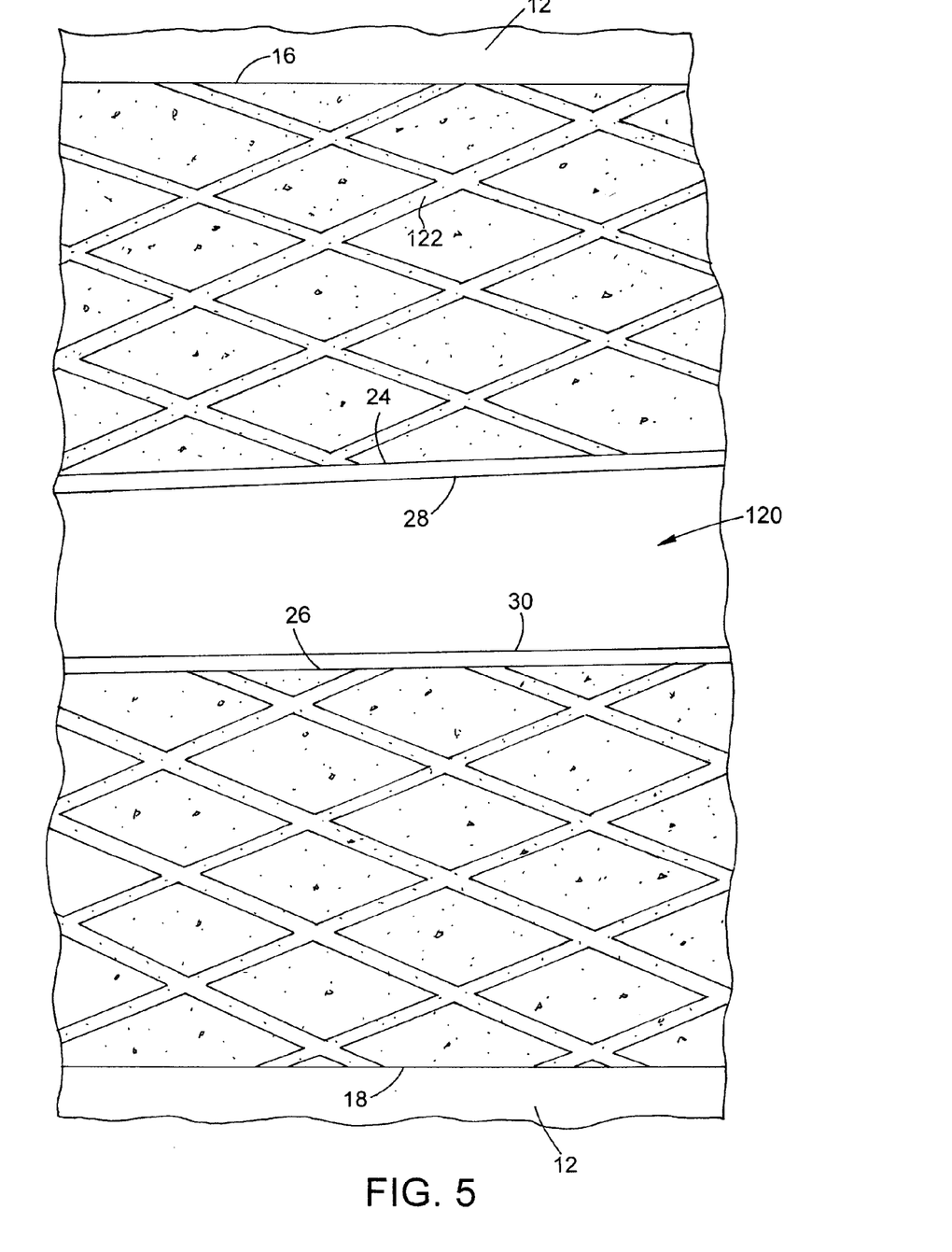
FIG. 5 is a top view of a portion of the conduit illustrated in FIGS. 2-4.

Wear resisting plates 28 and 30 (typically made of steel) on side walls 24 and 26 of slot 22 have an upper surface that tends to become slippery and, in the past, has tended to cause animals in a region of the barn floor where slot 22 is located to slip despite texturing of floor 12 outside of walls 16 and 18 of floor slot 14. I have found that texturing upper face 120 of conduit 20 between mating slots 14 and 22, as illustrated by the coarse diamond shaped texturing 122 in FIG. 5, reduces and/or overcomes the tendency of the animals to slip on the upper surface. Texturing 122 on face 120 is much denser, coarser and deeper than the texturing on the portions of floor 12 outside of slot 14.

While the various embodiments of the present invention have been illustrated and described, it will be clear that the present invention is not limited to these embodiments only. For example, while two pairs of blades that pivot with respect to each other depending on direction of movement is described, it is possible to have a single arm that pivots to collect the manure in both directions and other blade configurations ad described in my earlier patent. Numerous other modifications, changes, variations, substitutions and equivalents will be apparent to those skilled in the art without departing from the spirit and scope of the present invention as described in the claims.

What is claimed is:

1. A system for scraping manure from a barn floor having an elongated first slot, the system comprising an elongated conduit in the floor, the conduit having an elongated second slot mating with the first slot, the first and second slots being arranged so manure scraped from the floor by blades on a trolley moving in a direction of the elongated conduit can pass through the slots and move into the conduit; the trolley including (a) a paddle rotatable about a horizontal axis that is transverse to the slots, and (b) a structure carrying the paddle; parts of the trolley, including the paddle, the horizontal axis and the structure being located in the conduit so the paddle can extend from the trolley part in the conduit, the horizontal axis in the conduit, and the structure part in the conduit through the slots so that, as the paddle turns about the horizontal axis, the paddle can urge manure scraped by the blades into the conduit; wherein the trolley carries wheels that are located entirely in the conduit and bear on an interior lower surface of the conduit, the wheels being drivingly connected with the structure carrying the paddles so that as the wheels turn on the lower surface of the conduit the paddle is driven about the horizontal axis.

2. The system of claim 1 wherein the interior lower surface of the conduit has an arcuate shape that is concave with respect to the horizontal axis, the wheels bearing against the arcuate shape so the arcuate shape can guide the wheels and maintain the wheels in place for substantially preventing the paddle from wobbling transversely of the slot.

3. The system of claim 2 wherein the trolley includes two sets of wheels, the first set of wheels being longitudinally displaced from and on a first side of the horizontal axis, the second set of wheels being longitudinally displaced from and on a second side of the horizontal axis, each of the sets including first and second wheels on opposite sides of the second slot and on opposite sides of a point on the arcuate surface farthest from the floor in the vertical direction.

4. The system of claim 3 wherein the arcuate surface is a segment of a circle.

5. The system of claim 1 wherein the structure carries several paddles and the driving connection between the wheels and the structure carrying the paddles is such that each of the paddles rotates at a higher speed than the wheels.

6. The system of claim 1 wherein the trolley includes a plow arranged for moving the manure in the conduit along the length of the conduit.

7. The system of claim 1 further including cables for moving the trolley in first and second longitudinal directions in the conduit.

8. The system of claim 2 wherein the conduit includes wear resisting members abutting walls of the second slot and extending to a surface of the barn floor, the wear resisting members having an upper surface that tends to become slippery and tends to cause livestock in a region of the barn floor where the second slot is located to slip, an upper face of the conduit between the first and second mating slots being textured to reduce and/or overcome the tendency of the livestock to slip on the upper surface.

9. The system of claim 8, wherein the texture of the upper face of the conduit between the first and second slots is greater than the texture of the barn floor outside the second slot.

10. The system of claim 1, wherein the drive is arranged to rotate the paddle and the structure about the horizontal axis in response to the trolley being moved in the elongated direction of the conduit.

11. A system for scraping manure from a barn floor having an elongated first slot, the system comprising an elongated conduit in the floor, the conduit having an elongated second slot mating with the first slot, the first and second slots being arranged so manure scraped from the floor by blades on a trolley moving in a direction of the elongated conduit can pass through the second slot and move into the conduit; the trolley including (a) a paddle rotatable about a horizontal axis that is transverse to the slots, (b) a structure carrying the paddle; and (c) wheels that are located entirely in the conduit and bear on an interior lower surface of the conduit, the wheels being drivingly connected with the structure carrying the paddles so that as the wheels turn on the lower surface of the conduit the paddle is driven about the horizontal axis; the paddle, the slots and the structure carrying the paddle being arranged so that, as the paddle turns about the horizontal axis, the paddle can urge manure scraped by the blades into the conduit.

12. The system of claim 11 wherein the trolley includes two sets of wheels, the first set of wheels being longitudinally displaced from and on a first side of the horizontal axis, the second set of wheels being longitudinally displaced from and on a second side of the horizontal axis, each of the sets including first and second wheels on opposite sides of the first slot and on opposite sides of a point on an arcuate surface farthest from the floor in the vertical direction.

13. The system of claim 12 wherein the arcuate surface is a segment of a circle.

14. The system of claim 11 wherein the trolley includes a plow arranged for moving the manure in the conduit along the length of the conduit.

15. The system of claim 14 wherein the structure carrying the paddle carries several paddles and the driving connection between the wheels and the structure carrying the paddles is such that each of the paddles rotates at a higher speed than the wheels.

16. The system of claim 11 further including cables for moving the trolley in first and second longitudinal directions in the conduit.

17. The system of claim 11 wherein the conduit includes wear resisting members abutting walls of the second slot and extending to a surface of the barn floor, the wear resisting members having an upper surface that tends to become slippery and tends to cause livestock in a region of the barn floor where the second slot is located to slip, an upper face of the conduit between the first and second mating slots being textured to reduce and/or overcome the tendency of the livestock to slip on the upper surface.

18. The conduit of claim 17, wherein the texture of the upper face of the conduit between the first and second slots is greater than the texture of the barn floor outside the second slot.

19. A trolley for use in a system for scraping manure from a barn floor having an elongated first slot, the system comprising an elongated conduit in the floor, the conduit having an elongated second slot mating with the first slot, the first and second slots being arranged so manure scraped from the floor by blades on a trolley moving in a direction of the elongated conduit can pass through the second slot and move into the conduit; the trolley comprising (a) a paddle rotatable about a horizontal axis that is transverse to the slots, (b) a structure carrying the paddle, and (c) a drive for rotating the paddle and the structure about the horizontal axis; parts of the trolley, including the paddle, the horizontal axis and the structure being arranged so that when located in the conduit the paddle can extend from (a) the horizontal axis in the conduit, and (b) the structure in the conduit carrying the paddle through the second slot so that, as the paddle turns about the horizontal axis, the paddle can urge manure scraped by the blades into the conduit; the drive and the structure being such that while the trolley is in the conduit the drive and the structure are located entirely in the conduit, the trolley carrying wheels that are adapted to be located entirely in the conduit and bear on an interior lower surface of the conduit, the wheels being drivingly connected with the structure carrying the paddles so that as the wheels turn on the lower surface of the conduit the paddle is driven about the horizontal axis.

20. The trolley of claim 19 wherein the structure carrying the paddle carries several paddles and the driving connection between the wheels and the structure carrying the paddles is such that each of the paddles rotates at a higher speed than the wheels.

21. A trolley for use in a system for scraping manure from a barn floor having an elongated first slot, the system comprising an elongated conduit in the floor, the conduit having an elongated second slot mating with the first slot, the first and second slots being arranged so manure scraped from the floor by blades on the trolley moving in a direction of the elongated conduit can pass through the second slot and move into the conduit; the trolley comprising (a) a paddle rotatable about a horizontal axis that is transverse to the slots, (b) a structure carrying the paddle, and (c) wheels that are adapted to be located entirely in the conduit and adapted to bear on an interior lower surface of the conduit, the wheels being drivingly connected with the structure carrying the paddle so that as the wheels turn on the lower surface of the conduit the paddle is driven about the horizontal axis; the paddle and the structure carrying the paddle being arranged and adapted to be located in the conduit so that, as the paddle turns about the horizontal axis, the paddle can urge manure scraped by the blades into the conduit.

22. The trolley of claim 21 wherein the trolley includes two sets of wheels, the first set of wheels being longitudinally displaced from and on a first side of the horizontal axis, the second set of wheels being longitudinally displaced from and on a second side of the horizontal axis, each of the sets including first and second wheels arranged to be on opposite sides of the first slot and on opposite sides of a point on an arcuate surface farthest from the floor in the vertical direction.

\* \* \* \* \*